UNITED STATES PATENT OFFICE.

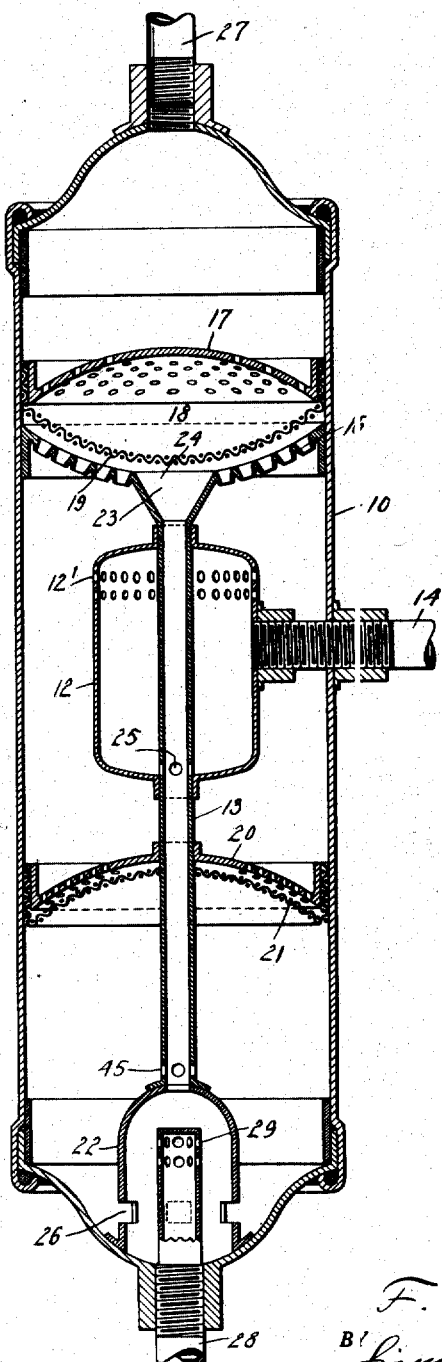

FRANK PACZIGA, OF NEW YORK, N. Y.

STEAM-SEPARATOR.

1,223,101.  Specification of Letters Patent.  Patented Apr. 17, 1917.

Application filed June 24, 1916. Serial No. 105,576.

*To all whom it may concern:*

Be it known that I, FRANK PACZIGA, a citizen of the United States, and a resident of the city of New York, in the county of New York and State of New York, have invented certain new and useful Improvements in Steam-Separators, of which the following is a specification.

The present invention relates to a steam separator, or in other words to a device wherein moisture or water particles are separated from steam in order to produce dry steam.

The main object of the invention is to provide a steam separator or drier that is simple in construction, efficient in operation, and that can be manufactured at a comparatively low cost.

With these and other objects in view, which will more fully appear as the nature of the invention is better understood, the same consists in the combination, arrangement, and construction of parts hereinafter described, pointed out in the appended claims and illustrated in the accompanying drawings, it being understood that many changes may be made in the size and proportion of the several parts and details of construction within the scope of the appended claims without departing from the spirit or sacrificing any of the advantages of the invention.

One of the many possible embodiments of the invention is illustrated in the accompanying drawing, which represents a vertical central section taken through the separator forming the subject matter of the present application for Letters Patent.

The separator comprises a closed receptacle 10, within which is disposed a small vessel 12, through which extends a tube 13, that is located preferably in the longitudinal axis of the receptacle and serves a purpose hereinafter to be described. The vessel 12 is provided with small perforations 12', is attached in any suitable manner to the said tube, and is of small dimensions compared with the receptacle 10. From an inspection of the drawings it will be observed that the vessel is located substantially in the center of the receptacle. To the vessel leads a steam supply pipe 14, controlled by a valve not shown in the drawing. Above the vessel 12 is disposed within the receptacle a perforated dished partition plate 16, and above this plate is arranged a perforated plate 17, that is dished in a direction opposite to which the plate 16 is concaved. These two plates inclose a space 18, within which is located a fine-meshed wire fabric 19. Below the vessel 12 there is located a perforated partition plate 20, which is convexo-concave, and associated with a fine-meshed wire fabric 21, that is arranged below the said plate. The purposes of these partition plates and wire fabrics will be described hereinafter.

The tube 13 leads from the space 18 above mentioned down through the vessel 12 and the partition plate 20, toward the bottom of the receptacle 10, where it is enlarged in diameter, as clearly shown at 22. The upper end of the tube 13 is provided with a flaring mouth 23, in communication with an aperture 24 in the dished plate 16. The perforations of the latter plate are formed in such a manner that their edges upon the underface of the said plate are roughened to aid in the separation of the moisture from the steam, as the said steam passes through these perforations. The water of condensation or moisture separated from the steam within the vessel 12 is adapted to flow into the tube 13 through perforations 25, and the water collected in the receptacle is adapted to pass into the enlarged section 22 of the tube through openings 26 near the lower end of the said enlarged section.

The steam is led away from the separator through a service pipe 27, which is tapped into the top portion of the said separator, and the water separated from the steam is led off by a pipe 28 that extends through the bottom of the receptacle 10 and projects into the enlarged section 22 of the tube 13. The upper end of the pipe 28 is closed, and near the said upper end it is provided with a plurality of perforations 29, which are located considerably higher than the openings 26. A valve 30 is inserted into the pipe 28 outside the receptacle.

The operation of this device is as follows: Steam is admitted into the separator by setting the valve in the steam supply pipe 14 to its open position. The steam reaches thus the vessel 12, from which it flows through the perforations 12' into the receptacle 10. As it flows through these perforations some of the moisture is separated therefrom, and collects in the said vessel, to pass through the perforation 25 into the tube 13. When entering the receptacle, the steam first reaches the compartment between the dished plate 16 and the partition plate 20, and has a tendency to flow through the perforations in the plate 16 into the space 18, after having passed through the fine meshed fabric 19, and from the space 18 through the perforations in the partition 17 into the compartment above the last named partition. As the steam flows in the manner indicated, moisture is separated therefrom by the rough edged perforations of the disk 16, the wire fabric 19, and by the partition 17, so that, when it reaches the compartment above the last named partition, it is completely dry.

The moisture, separated from the steam by the partition 16 and the wire fabric 19, drops onto the partition 20, and that separated by the partition 17 flows into the tube 13. Through the partition 20 the water is forced by steam pressure and, as it passes through the fine meshed fabric 21, steam that may be mixed therewith or entrained thereby is separated therefrom. The moisture or water of condensation collects thus on the bottom of the receptacle 10, and also in the enlarged section 22 of the tube 13. The water of condensation flows from the receptacle through the openings 26 into the enlarged section 22 of the tube, wherein it rises gradually until it reaches the level of the perforations 29, through which it flows into the pipe 28.

Any steam that may collect in the space below the partition plate 20 is adapted to flow into the tube 13 through perforations 45 therein, and from this tube through the partition plate 17 into the dry-steam chamber above the last named partition.

It is to be observed that the water of condensation collecting upon the bottom of the separator forms a seal, to prevent the escape of steam from the separator toward the waste pipe.

From the foregoing it appears that, broadly speaking, the separator consists of a closed receptacle, that is divided by a plurality of perforated partitions into a number of compartments, one of which is in direct communication with the steam supply pipe and constitutes the separation space, one above the partitions forming the dry-steam chamber, and one below the partitions forming the collecting chamber for the water of condensation.

What I claim is:

1. A steam separator, comprising a closed receptacle, two perforated partitions dividing said receptacle into three compartments, said receptacle having a steam outlet in direct communication with one of said compartments and a water outlet in a similar communication with another one of said compartments, a perforated vessel disposed in the third compartment, and a steam supply pipe leading to said perforated vessel.

2. A steam separator, comprising a closed receptacle, two perforated partitions dividing said receptacle into three compartments one disposed on top of another, said receptacle having a steam outlet in direct communication with the uppermost of said compartments and a water outlet in a similar communication with the lowermost of said compartments, a perforated vessel disposed in the intermediate compartment, and a steam supply pipe leading to said perforated vessel.

3. A steam separator, comprising a closed receptacle, two perforated partitions dividing said receptacle into three compartments one disposed on top of another, said receptacle having a steam outlet in direct communication with the uppermost of said compartments and a water outlet in a similar communication with the lowermost of said compartments, a perforated vessel disposed in the intermediate compartment, a steam supply pipe leading to said perforated vessel, a fine-meshed fabric arranged above the upper partition, and a fine-meshed fabric disposed below the lower partition.

4. A steam separator, comprising a closed receptacle, two perforated partitions dividing said receptacle into three compartments one disposed on top of another, said receptacle having a steam outlet in direct communication with the uppermost of said compartments and a water outlet in a similar communication with the lowermost of said compartments, a perforated vessel disposed in the intermediate compartment, a steam supply pipe leading to said perforated vessel, and a tube connecting the uppermost compartment with said water outlet, said tube having perforations within said vessel and also within the lowermost one of said compartments.

5. A steam separator, comprising a closed receptacle, two perforated partitions dividing said receptacle into three compartments one disposed on top of another, said receptacle having a steam outlet in direct communication with the uppermost of said compartments and a water outlet in a similar communication with the lowermost of said compartments, and a steam supply pipe leading to the intermediate compartment.

Signed at New York, in the county of New York, and State of New York, this 20th day of June, A. D. 1916.

FRANK PACZIGA.